United States Patent
Liu et al.

(10) Patent No.: US 9,456,404 B2
(45) Date of Patent: Sep. 27, 2016

(54) WIRELESS COMMUNICATION SYSTEM AND RESOURCE ALLOCATION METHOD THEREOF

(71) Applicant: Institute For Information Industry, Taipei (TW)

(72) Inventors: Shu-Tsz Liu, Taipei (TW); Tsung-Yu Tsai, Tainan (TW); Hsuan-Li Lin, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/454,638

(22) Filed: Aug. 7, 2014

(65) Prior Publication Data
US 2015/0045018 A1 Feb. 12, 2015

Related U.S. Application Data

(60) Provisional application No. 61/863,924, filed on Aug. 9, 2013, provisional application No. 61/953,023, filed on Mar. 14, 2014, provisional application No. 61/991,444, filed on May 9, 2014.

(51) Int. Cl.
*H04W 48/12* (2009.01)
*H04W 72/04* (2009.01)
*H04L 1/00* (2006.01)
*H04W 92/18* (2009.01)

(52) U.S. Cl.
CPC .............. *H04W 48/12* (2013.01); *H04L 1/00* (2013.01); *H04W 72/042* (2013.01); *H04W 92/18* (2013.01)

(58) Field of Classification Search
CPC . H04W 92/18; H04W 48/12; H04W 72/046; H04L 1/00
See application file for complete search history.

(56) References Cited

U.S. PATENT DOCUMENTS

| | | | |
|---|---|---|---|
| 2012/0064935 A1* | 3/2012 | Hakola et al. | 455/513 |
| 2013/0022010 A1 | 1/2013 | Qianxi et al. | |
| 2013/0051277 A1* | 2/2013 | Hakola et al. | 370/254 |
| 2013/0109301 A1 | 5/2013 | Hakola et al. | |
| 2013/0157656 A1* | 6/2013 | Gao et al. | 455/434 |
| 2013/0286862 A1* | 10/2013 | Sartori | H04W 76/023 370/252 |
| 2014/0003319 A1* | 1/2014 | Etemad | H04W 28/08 370/312 |
| 2014/0057670 A1* | 2/2014 | Lim et al. | 455/509 |

(Continued)

FOREIGN PATENT DOCUMENTS

| | | |
|---|---|---|
| WO | 2010082114 A1 | 7/2010 |
| WO | 2013075340 A1 | 5/2013 |

OTHER PUBLICATIONS

Office Action to the corresponding Taiwan Patent Application rendered by Taiwan Intellectual Property Office (TIPO) on Jul. 16, 2015, 16 pages (including summary English translation).

*Primary Examiner* — Kenneth Lam
(74) *Attorney, Agent, or Firm* — Skaar Ulbrich Macari, P.A.

(57) ABSTRACT

A wireless communication system and a resource allocation method thereof are provided. The wireless communication system includes a base station and a plurality of user equipments. The base station or one of the user equipments is configured to transmit resource allocation information to the user equipments. The user equipments are configured to perform a device-to-device communication and/or perform a device-to-device discovery according to the resource allocation information. The resource allocation method is applied to the wireless communication system to perform the aforesaid operations.

30 Claims, 7 Drawing Sheets

(56) References Cited

U.S. PATENT DOCUMENTS

| | | | |
|---|---|---|---|
| 2014/0140304 A1* | 5/2014 | Yang et al. | 370/329 |
| 2014/0204898 A1* | 7/2014 | Yang et al. | 370/330 |
| 2014/0254429 A1* | 9/2014 | Wang | H04L 5/0037 370/254 |
| 2014/0314039 A1* | 10/2014 | Jang | H04W 76/023 370/329 |
| 2014/0321452 A1* | 10/2014 | Choi et al. | 370/350 |
| 2014/0328329 A1* | 11/2014 | Novlan | H04W 72/042 370/336 |
| 2015/0029893 A1* | 1/2015 | Gulati | H04W 48/12 370/254 |
| 2015/0043448 A1* | 2/2015 | Chatterjee et al. | 370/329 |
| 2015/0131566 A1* | 5/2015 | Seo | H04B 1/3838 370/329 |
| 2015/0271859 A1* | 9/2015 | Huang | H04W 72/12 370/329 |

\* cited by examiner

WIRELESS COMMUNICATION SYSTEM AND RESOURCE ALLOCATION METHOD THEREOF

PRIORITY

This application claims priority to U.S. Provisional Patent Application No. 61/863,924 filed on Aug. 9, 2013, U.S. Provisional Patent Application No. 61/953,023 filed on Mar. 14, 2014, and U.S. Provisional Patent Application No. 61/991,444 filed on May 9, 2014, which are all hereby incorporated by reference herein in their entirety.

FIELD

The present invention relates to a communication system and a resource allocation method thereof. More particularly, the present invention relates to a wireless communication system and a resource allocation method thereof.

BACKGROUND

With development of the wireless broadband networks and mobile communication technologies, users have now been accustomed to use of various mobile apparatuses in dealing with different matters such as in working, communication or entertainment. For conventional wireless communication systems, data and control signals necessary for wireless communication between user equipments (UEs) must all be processed by a base station and a core network, and this will cause the problem of core network congestion in the conventional wireless communication systems. Correspondingly, the concept of device-to-device (D2D) communication has been proposed to cope with this problem. The D2D communication means that a UE can directly communicate with a target device without a base station or an access point (AP). As compared to the conventional way in which UEs must communicate to each other via a base station, the D2D communication has the advantages of reducing the transmission power, decreasing the transmission delay and improving the spatial reuse efficiency.

Unlike the conventional D2D communication technologies such as Bluetooth, Wireless Fidelity (Wi-Fi) or the like, the new generation of D2D communication technologies (e.g., the LTE D2D communication technology proposed by the $3^{rd}$ Generation Partnership Project (3GPP) Long Term Evolution/Long Term Evolution-Advanced (LTE/LTE-A)) attracts more and more attention because they can search for neighboring devices within a large range quickly by use of a legally authorized frequency spectrum and allow for direct communication under the control and assistance of the base station. Nevertheless, the new generation of D2D communication technologies are still confronted with various problems and challenges.

For example, the new generation of D2D communication technologies are implemented on the basis of the existing wireless communication architecture, so they have to share the pre-existing wireless frequency spectrum resources with the existing wireless communication systems. Therefore, in order to prevent influences on the respective communication performances of the new generation of D2D communication technologies and the existing wireless communication systems as well as to prevent interferences between the new generation of D2D communication technologies and the existing wireless communication systems, adjustment must be made on the pre-existing control and management of the wireless frequency spectrum resources. Accordingly, an urgent need exists in the art to provide an effective resource allocation technology for the new generation of D2D communication technologies.

SUMMARY

An objective of the present invention includes providing an effective resource allocation technology for the new generation of D2D communication technologies.

To achieve this objective, a wireless communication system is provided in certain embodiments of the present invention. The wireless communication system comprises a base station and a plurality of user equipments (UEs). The UEs include a first UE. The base station or the first UE is configured to transmit resource allocation information to the UEs, and the UEs are configured to perform device-to-device communication and/or perform device-to-device discovery according to the resource allocation information.

To achieve this objective, a resource allocation method for use in a wireless communication system is also provided in certain embodiments of the present invention. The wireless communication system comprises a base station and a plurality of UEs, and the UEs include a first UE. The resource allocation method comprises:

(a) enabling the base station or the first UE to transmit resource allocation information to the UEs; and (b) enabling the UEs to perform device-to-device communication and/or perform device-to-device discovery according to the resource allocation information.

According to the above descriptions, a wireless communication system and a resource allocation method thereof are provided in certain embodiments of the present invention. More particularly, when a plurality of UEs need to perform D2D communication (including one-to-one D2D communications, one-to-multiple D2D communications, multiple-to-one D2D communications, multiple-to-multiple D2D communications, and D2D communications performed through relaying) and/or perform device-to-device discovery therebetween, the certain embodiments of the present invention can evaluate various resources necessary for the D2D communication and/or device-to-device discovery by means of a base station or one of the UEs according to the pre-existing resource conditions and different needs, and transmit a corresponding piece of resource allocation information to the UEs. Then, the UEs can perform the D2D communication and/or perform the device-to-device discovery according to the resource allocation information received. Because the resources necessary for the D2D communication and/or device-to-device discovery between the UEs are pre-evaluated by the base station or one of the UEs before being allocated, the problem of resource contention is avoided in the present invention. Furthermore, interferences of the D2D communication and/or the device-to-device discovery of the UEs and the pre-existing communication between the UEs and the base station with each other can also be effectively avoided.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

Hereinafter, a brief description of the drawings will be made, but this is not intended to limit the present invention.

DETAILED DESCRIPTION

In the following description, the present invention will be explained with reference to certain example embodiments thereof. However, these example embodiments are not intended to limit the present invention to the specific examples, embodiments, environment, applications, structures, process flows or steps, which are described in these example embodiments. In other words, description of these example embodiments is only for purpose of illustration rather than to limit the present invention. In the attached drawings, elements unrelated to the present invention are omitted from depiction; and dimensional relationships among individual elements are illustrated only for ease of understanding but not to limit the actual scale.

An embodiment of the present invention (briefly called as "the first embodiment" hereinafter) is a wireless communication system. Preferably, the wireless communication system conforms to the basis architecture of the LET technology of 3GPP. This means that the basic architecture conforms to the standards formulated for the LTE series technologies, including the LTE technology, the LTE-Advanced technology, and precursor technologies of the LTE technology (e.g., UMTS (Universal Mobile Telecommunications System), GSM (Global System for Mobile Communications) and etc.). The wireless communication system may comprise at least one base station (i.e., one or more base stations) and a plurality of user equipments (UEs).

Figure 1:
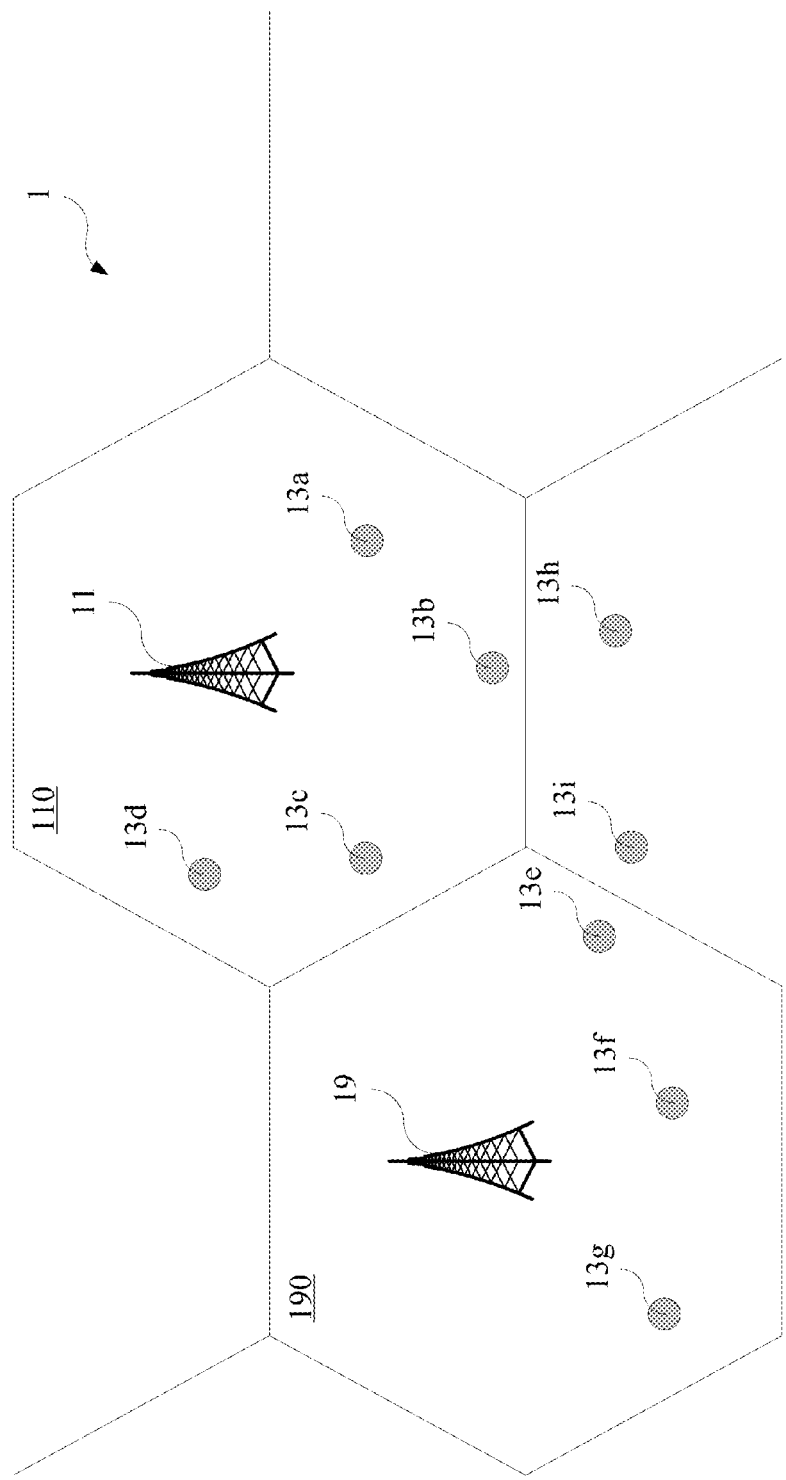
FIG. 1 is a schematic structural view of a wireless communication system according to an embodiment of the present invention.

FIG. 1 is a schematic structural view illustrating the wireless communication system described above. As shown in FIG. 1, the wireless communication system 1 may comprise a base station 11, a base station 19 and a plurality of UEs 13a-13i. In the basic architecture of the LTE technology of 3GPP, each of the base stations 11 and 19 may be an eNodeB, and each of the UEs 13a-13i may be a UE. The base station 11 may have a signal coverage 110, and the base station 19 may have a signal coverage 190. The UEs 13a, 13b, 13c and 13d are located within the signal coverage 110 of the base station 11, and the UEs 13e, 13f and 13g are located within the signal coverage 190 of the base station 19. Additionally, the UEs 13h and 13i are not located in the signal coverage of either of the base stations. The number of base stations and coverages thereof, or the number of UEs and locations thereof shown in FIG. 1 are all provided for purpose of illustration, but not to limit the present invention.

Within the coverage 110, the base station 11 can evaluate various resources necessary for all or a part of the UEs 13a-13d to perform D2D communication and/or perform device-to-device discovery according to the pre-existing resource conditions and different needs, and transmits corresponding resource allocation information 20 to all or a part of the UEs 13a-13d. Then, all or a part of the UEs 13a-13d can perform the D2D communication and/or device-to-device discovery according to the resource allocation information 20 that is received.

Similarly, within the coverage 190, the base station 19 can evaluate various resources necessary for all or a part of the UEs 13e-13g to perform D2D communication and/or perform device-to-device discovery according to the pre-existing resource conditions and different needs, and transmits corresponding resource allocation information 20 to all or a part of the UEs 13e-13g. Then, all or a part of the UEs 13e-13g can perform the D2D communication and/or perform the device-to-device discovery according to the resource allocation information 20 that is received.

Additionally, through information exchange between the base station 11 and the base station 19, the base station 11 or the base station 19 can more extensively evaluate various resources necessary for all or a part of the UEs 13a-13g to perform D2D communication and/or perform device-to-device discovery according to the pre-existing resource conditions and different needs, and transmits corresponding resource allocation information 20 to all or a part of the UEs 13a-13g. Then, all or a part of the UEs 13a-13g can perform the D2D communication and/or the device-to-device discovery according to the resource allocation information 20 that is received.

Furthermore, each of the UEs 13a-13i may be optionally used as a relay having a relaying function so that various information can be exchanged among the UEs 13a-13i, the base station 11 and the base station 19. In this way, UEs that have received the resource allocation information 20 can be used to relay a part or all of the resource allocation information 20 to other UEs that have not received the resource allocation information 20 depending on different needs. Therefore, although the UEs 13h and 13i are not located within the signal coverage 110 or 190, the base station 11 or the base station 19 can still transmit the resource allocation information 20 to the UEs 13h and 13i through the relaying function of the UEs 13a-13g.

In a word, any base station in the wireless communication system 1 (e.g., the base station 11 or 19) can evaluate various resources necessary for all or a part of the UEs 13a-13i to perform D2D communication and/or perform device-to-device discovery according to the pre-existing resource conditions and different needs, and transmits the corresponding resource allocation information 20 to all or a part of the UEs 13a-13i. Then, all or a part of the UEs 13a-13i can perform the D2D communication and/or the device-to-device discovery according to the resource allocation information 20 received.

As an example, one, a part or all of the UEs 13a-13d may transmit a resource allocation request and/or capacity information to the base station 11 or 19. Then, the base station 11 or 19 may evaluate various resources and related parameters necessary for all or a part of the UEs 13a-13d to perform D2D communication and/or perform device-to-device discovery according to the overall E-UTRAN (Evolved UMTS Terrestrial Radio Access) network and/or the EPC (Evolved Packet Core) network and/or the WAN (Wide-Area network)

system resources and/or D2D system resources. The various resources necessary may relate to, for example, resources available to the base station 11 or 19 itself, inter/intra cell information, the handover request and so on.

The aforesaid D2D communication may include one-to-one D2D communication, e.g., the D2D communication between the UE 13a and any of the UEs 13b-13i. The aforesaid D2D communication may include one-to-multiple D2D communication, e.g., the D2D communication between the UE 13a and all or a part of the UEs 13b-13i. The aforesaid D2D communication may include multiple-to-one D2D communication, e.g., the D2D communication between all or a part of the UEs 13b-13i and the UE 13a. The aforesaid D2D communication may include multiple-to-multiple D2D communication, e.g., the D2D communication between the UEs 13a-13d and the UEs 13e-13i. The aforesaid D2D communication may include D2D communication performed through relaying, e.g., the D2D communication performed between the UE 13a and the UE 13h through relaying by the UE 13b. The aforesaid D2D communication may substantially include various kinds of D2D communication, and is not limited to what described above.

On the other hand, taking FIG. 1 as an example, any of the UEs 13a-13i besides the base station 11 or 19 may also be used to evaluate various resources necessary for all or a part of the UEs 13a-13i to perform D2D communication (including one-to-one D2D communications, one-to-multiple D2D communications, multiple-to-one D2D communications, multiple-to-multiple D2D communications, and D2D communications performed through forwarding) and/or perform device-to-device discovery according to the pre-existing resource conditions and different needs, and transmits the corresponding resource allocation information 20 to all or a part of the UEs 13a-13i. Then, all or a part of the UEs 13a-13i can perform the D2D communication and/or the device-to-device discovery according to the resource allocation information 20 received. For convenience of description, the one of the UEs 13a-13i that is used to evaluate the resources and transmit the resource allocation information 20 to the UEs is briefly called as "the first UE 13".

As an example, one, a part or all of the UEs 13a-13d may optionally transmit a resource allocation request and/or capacity information to any of the UEs 13a-13i. Then, UEs receiving the resource allocation request and/or capacity information can evaluate various resources and related parameters necessary for all or a part of the UEs to perform D2D communication and/or perform device-to-device discovery according to the resource allocation request received and depending on the overall E-UTRAN network and/or EPC network and/or WAN system resources and/or D2D system resources. Said various resources necessary may relate to, for example, the extent to which relaying is needed, the signal transmission type (e.g., broadcast, multicast, or unicast), whether to have the resource assigned by the base station instead, and so on.

Each of the UEs 13a-13i may be in an idle mode or a connected mode. Each of the UEs 13a-13i can switch between the idle mode and the connected mode in a Radio Resource Control (RRC) interface, a Non-Access Stratum (NAS) interface or a device-to-device specific interface. The first UE 13 can evaluate the resources and transmit the resource allocation information 20 whether it is in the idle mode or the connected mode; and the UEs 13a-13i can receive the resource allocation information 20 whether they are in the idle mode or the connected mode.

Furthermore, a UE may be in the connected mode or the idle mode. The connected mode may refer to "the wireless connection between the UE and the base station" or "the wireless connection between devices", and the idle mode may refer to "the wireless connection between the base station and the UE being in the idle mode" or "the wireless connection between devices being in the idle mode". In the wireless connected mode between a UE and a base station, it may be that the UE has not created any D2D wireless connection with other UEs, or the UE has created a D2D wireless connection with other UEs. In the wireless idle mode between a UE and a base station, it may be that the UE has not created any D2D wireless connection with other UEs, or the UE has created a D2D wireless connection with other UEs. In the wireless connected mode between a UE and another UE, it may be that the UEs have not created a wireless connection with the base station, or the UEs has created wireless connections with the base station. In the wireless idle mode between a UE and another UE, it may be that the UEs have not created a wireless connection with the base station, or the UEs have created wireless connections with the base station. If a D2D wireless connection between a UE and other UEs is no longer needed after the D2D wireless connection enters into the connected mode, the UE can directly enter into the idle mode. If there is a power saving demand but the function of D2D wireless connection is partly needed, the UE may also not enter into the idle mode directly but adopt a mode that provides the power saving function to save power, and then switch to the connected mode or the idle mode depending on the practical needs. Because a UE can perform D2D communication or communicate by the assistance of the base station within the network coverage, the UE may optionally operate in a full-duplex mode or a half-duplex mode with corresponding resource settings.

A UE within a coverage may be allowed to firstly adopt an allocation-by-base-station mode and then, if needed, adopt an allocation-by-UE mode to choose resources from a resource pool. Switching between the two modes can be triggered by many causes. For example, when no communication takes place between the UE and the base station, the allocation-by-UE mode can still allow whether the UE is located in a network coverage to transmit by means of the D2D communication technology. Additionally, if the mode switching mechanism can provide better efficiency, capability and flexibility, a base station will be able to configure a UE located within its coverage to switch its D2D transmission mode. Besides, mode switching in scenarios where no network is available (e.g., in public safety scenarios) can allow ProSe-enabled UEs in a special operation force to be switched to operate without assistance of a network so as to move away from the network coverage at any given time. In other words, it is essential to support direct D2D group calling between UEs without routing through infrastructure network equipment no matter whether the UEs are located within the network coverage.

Additionally, when a UE is temporarily located outside the network coverage, the user outside the network coverage must be able to access out of network voice communication immediately. In case that the communication signal is in poor quality or cannot be received inside a building or other closed spaces, UEs shall be able to communicate with each other without assistance of the infrastructure network equipment. In the two network-free scenarios, the allocation-by-UE mode will be used by the UEs for D2D communication and/or device-to-device discovery, which is likely to trigger a modification of the D2D communication mode from the allocation-by-base-station to the allocation-by-UE mode. When a UE is temporarily located outside the network coverage and the communication signal is in poor quality, a radio link detection mechanism can be triggered. Timer and constant may be adopted to estimate whether the radio link failure exists when the poor quality is detected. The allocation-by-UE mode can be applied for D2D communication and/or device-to-device discovery when these pool radio link criteria meet. Once the radio link is recovered, the allocation-by-eNB mode may be used for D2D communication and/or device-to-device discovery if needs. Besides, block allocation designs of resource pools of different modes may be independent from each other or partially overlapped. Or block allocation designs of resource pools may combine common and dedicated parts among different D2D communications and/or device-to-device discovery.

However, it is possible that the existing resource pool configuration information is unsuitable for choosing the altered resources in the scenario of resource allocation mode switching. In order to eliminate potential problems caused by the resource allocation mode switching, the base station may also provide new resource pool configuration information to the UE. Through a reconfiguration procedure, the base station can authorize a UE to use the new resource pool. Additionally, the UE may communicate by using preset resources available for communication or using D2D resources previously provided by the base station, or the UE transmits a request message to notify that the mode needs to be switched. This request message may be a dedicated RRC interface, and may indicate mode switching that is carried in the field of this message. After this request message is received, the base station will configure the UE correspondingly. For example, by use of the aforesaid technology, ProSe-enabled UEs in a special operation force can be switched to operate without assistance of a network at any given time and to operate with suitable D2D communication and/or device-to-device discovery resources.

In the switching scenario, the base station may transmit an explicit reconfiguration instruction, which may be triggered by a UE switching request message. Additionally, it is a must to ensure reliable transmission in the absence of network coverage whether UE manually or automatically switches the allocation mode. When a UE is temporarily located in a closed space, the signal-to-interference-plus-noise ratio (SINR), for example, is poor and this will cause a problem in connection. If the downlink power is measured to be lower than a threshold, the UE may transmit a measurement report to the base station. However, if, when there is out of network coverage and the measured downlink power is lower than the minimum margin, the base station cannot help the UE to handle a Radio Link Failure (RLF) event or RRC re-establishment, the UE can perform mode switching automatically to create voice communication with other UEs immediately. Therefore, it is important to support a UE switching automatically from the allocation-by-base-station mode to the allocation-by-UE mode when there is out of network coverage. Additionally, the allocation-by-base-station mode and the allocation-by-UE mode may also be switched depending on different transmission demands (e.g., QoS or QCI). If the UE switches the allocation mode automatically, it may also decide whether to report to the base station that it has switched the allocation mode.

The base station 11, the base station 19 or the first UE 13 may transmit the resource allocation information 20 to all or a part of the UEs 13a-13i through dedicated signaling or broadcast signaling via an RRC interface or a D2D interface. In other embodiments of the present invention, the base station 11, the base station 19 or the first UE 13 may also transmit the resource allocation information 20 to all or a part of the UEs 13a-13i in other ways or via other interfaces. According to the layer 1 and/or the source and destination layer 2 information, the UE can allow devices to communicate with each other successfully in the resource block.

Parameters that can be transmitted between the base station 11, the base station 19 and the UEs 13a-13d include but are not limited to: group ID information, uplink synchronization information, uplink timing control information, random access related procedures information, power control information, scheduling request information, channel quality indicator information, acknowledgement information, reference symbols information and so on.

Figure 2A:
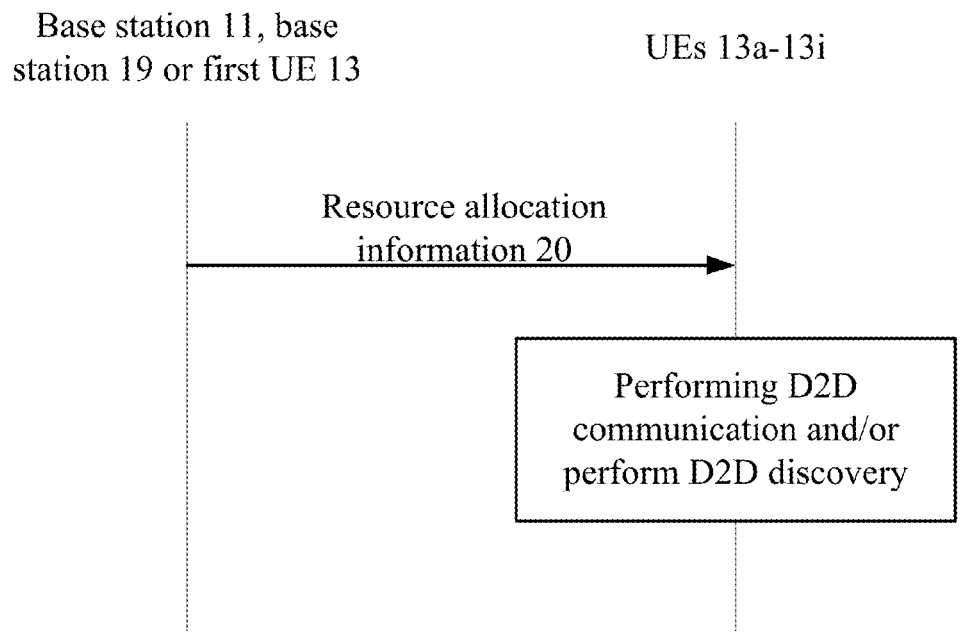
FIG. 2A is a schematic view illustrating operations of the wireless communication system shown in FIG. 1.

FIG. 2A is a schematic view illustrating operations of the wireless communication system 1. As shown in FIG. 2A, the base station 11, the base station 19 or the first UE 13 can evaluate various resources necessary for all or a part of the UEs 13a-13i to perform D2D communication and/or perform device-to-device discovery according to the pre-existing resource conditions and different needs, and transmits the corresponding resource allocation information 20 to all or a part of the UEs 13a-13i. Then, all or a part of the UEs 13a-13i can perform the D2D communication and/or device-to-device discovery according to the resource allocation information 20 that is received, as described above.

Figure 2B:
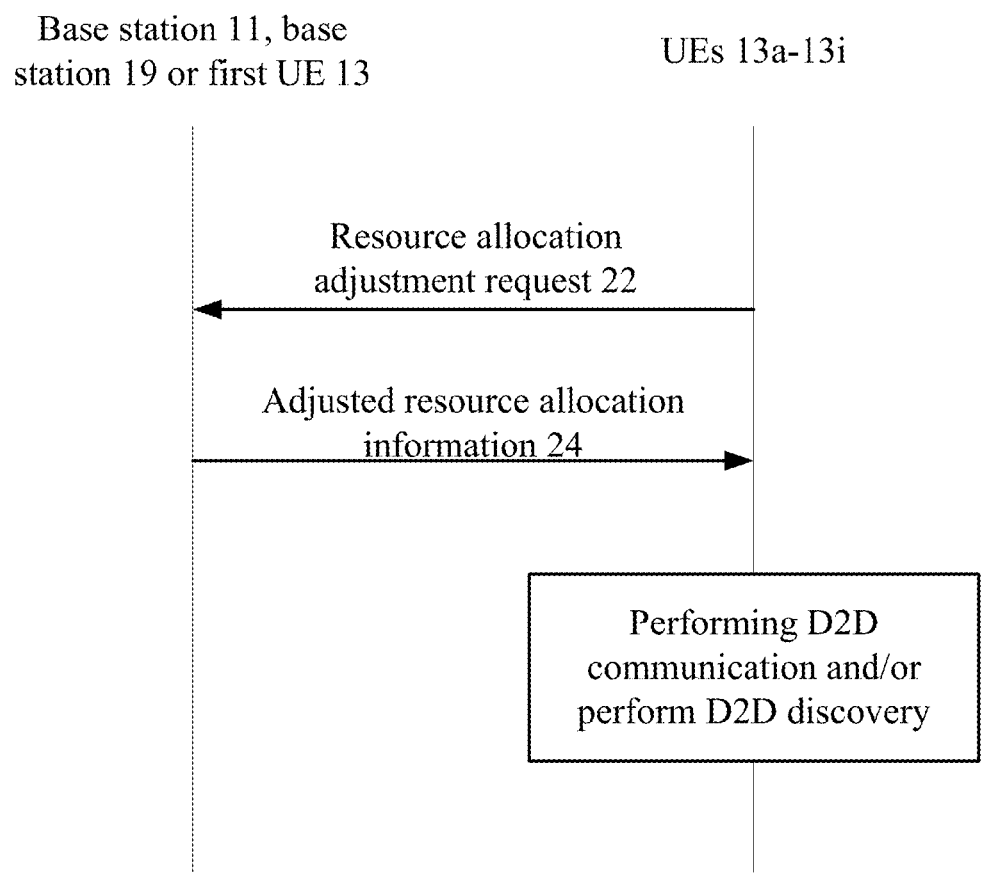
FIG. 2B is another schematic view illustrating operations of the wireless communication system shown in FIG. 1.

FIG. 2B is another schematic view illustrating operations of the wireless communication system 1. As shown in FIG. 2B, the base station 11, the base station 19 or the first UE 13 may transmit adjusted resource allocation information 24 to all or a part of the UEs 13a-13i according to a resource allocation adjustment request 22. Additionally, upon receiving the adjusted resource allocation information 24, all or a part of the UEs 13a-13i can perform corresponding D2D communication and/or perform device-to-device discovery according to the adjusted resource allocation information 24.

As an example, assume that one, a part or all of the UEs 13a-13i are unable to perform D2D communication and/or device-to-device discovery. In this case, the UE(s) may transmit to the base station 11, the base station 19 or the first UE 13 an RRC message, which may comprise the resource allocation adjustment request 22 and/or a resource allocation adjustment notice. If the resource allocation adjustment request 22 is comprised in the RRC message, the base station 11, the base station 19 or the first UE 13 can update the resource allocation into adjusted resource allocation information 24 according to the resource allocation adjustment request 22, and transmit the adjusted resource allocation information 24 to all or a part of the UEs 13a-13i. If a resource allocation adjustment notice is comprised in the RRC interface, the base station 11, the base station 19 or the first UE 13 may record that the resource allocation necessary for all or a part of the UEs 13a-13i to perform D2D communication and/or device-to-device discovery has been adjusted. Upon receiving the adjusted resource allocation information 24, all or a part of the UEs 13a-13i can perform corresponding D2D communication and/or device-to-device discovery according to the adjusted resource allocation information 24.

As another example, the base station 11, the base station 19 or the first UE 13 may also generate a resource allocation adjustment request 22 by itself in response to a change in the pre-existing resource conditions, then update the resource allocation into adjusted resource allocation information 24 according to the resource allocation adjustment request 22, and transmit the adjusted resource allocation information 24 to all or a part of the UEs 13a-13i. Upon receiving the adjusted resource allocation information 24, all or a part of the UEs 13a-13i performs corresponding D2D communication and/or device-to-device discovery according to the adjusted resource allocation information 24.

Furthermore, the resource allocation information 20 or the adjusted resource allocation information 24 may comprise a communication mode in which all or a part of the UEs 13a-13i perform D2D communication. In other words, by use of the resource allocation information 20 or the adjusted resource allocation information 24, the base station 11, the base station 19 or the first UE 13 may specify a communication mode in which all or a part of the UEs 13a-13i perform D2D communication. Hereinafter, three different communication modes in which the wireless communication system 1 performs D2D communication will be described with reference to FIG. 3A, FIG. 3B and FIG. 3C as examples.

Figure 3A:
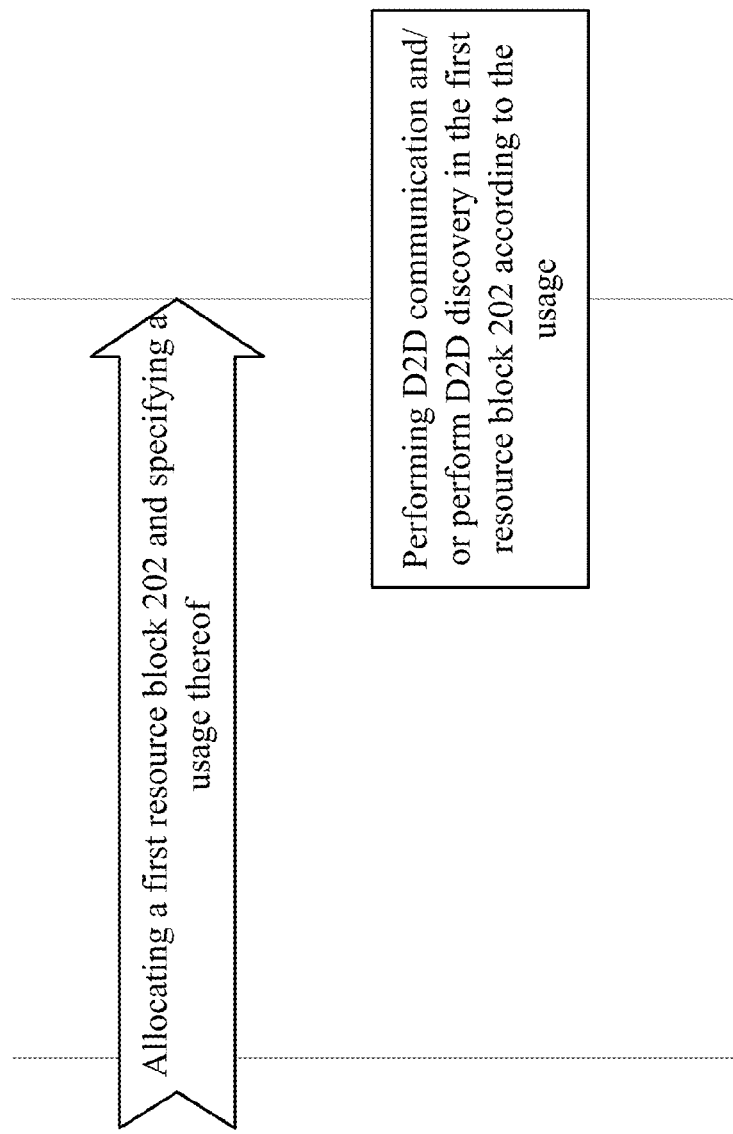
FIG. 3A is a schematic view illustrating specific operations of the wireless communication system shown in FIG. 1 when performing D2D communication in a communication mode.

FIG. 3A is a schematic view illustrating specific operations of the wireless communication system 1 when performing D2D communication in a communication mode. As shown in FIG. 3A, the base station 11, the base station 19 or the first UE 13 may specify a communication mode in which all or a part of the UEs 13a-13i perform the D2D communication to be a central control mode by use of the resource allocation information 20 or the adjusted resource allocation information 24. In the central control mode, the base station 11, the base station 19 or the first UE 13 may allocate at least one first resource block 202 to all or a part of the UEs 13a-13i, and specify a usage of the first resource block 202. Then, all or a part of the UEs 13a-13i perform corresponding D2D communication in the first resource block 202 according to the usage of the first resource block 202.

As an example, when the UE 13a is to perform D2D communication with the UE 13c, the base station 11, the base station 19 or the first UE 13 may allocate at least one first resource block 202 to the UE 13a and the UE 13c. The base station 11, the base station 19 or the first UE 13 further specifies howt uplink transmission be performed by the UE 13a (or the UE 13c) via the resources in the first resource block 202 and how reception be performed by the UE 13c (or the UE 13a) via the resources in the first resource block 202.

As another example, when the UE 13a is to perform one-to-multiple D2D communication or multiple-to-one D2D communication with the UEs 13b-13d, the base station 11, the base station 19 or the first UE 13 may allocate at least one first resource block 202 to the UEs 13a-13d. The base station 11, the base station 19 or the first UE 13 further specifies how uplink transmission be performed by the UE 13a (or the UEs 13b-13d) via the resources in the first resource block 202 and how reception be performed by the UEs 13b-13d (or the UE 13a) via the resources in the first resource block 202.

As a further example, when the UEs 13a-13d are to perform multiple-to-multiple D2D communication with the UEs 13e-13g, the base station 11, the base station 19 or the first UE 13 may allocate at least one first resource block 202 to the UEs 13a-13g. The base station 11, the base station 19 or the first UE 13 further specifies how uplink transmission be performed by the UEs 13a-13d (or the UEs 13e-13g) via the resources in the first resource block 202 and how reception be performed by the UEs 13e-13g (or the UEs 13a-13d) via the resources in the first resource block 202.

As yet another example, when the UE 13a is to perform D2D communication with the UE 13c via the UE 13b, the base station 11, the base station 19 or the first UE 13 may allocate at least one first resource block 202 to the UEs 13a-13c. The base station 11, the base station 19 or the first UE 13 further specifies how uplink transmission be performed by the UE 13a (or the UE 13c) via the resources in the first resource block 202, relaying be performed by the UE 13b via the resources in the first resource block 202 and how reception be performed by the UE 13c (or the UE 13a) via the resources in the first resource block 202.

Figure 3B:
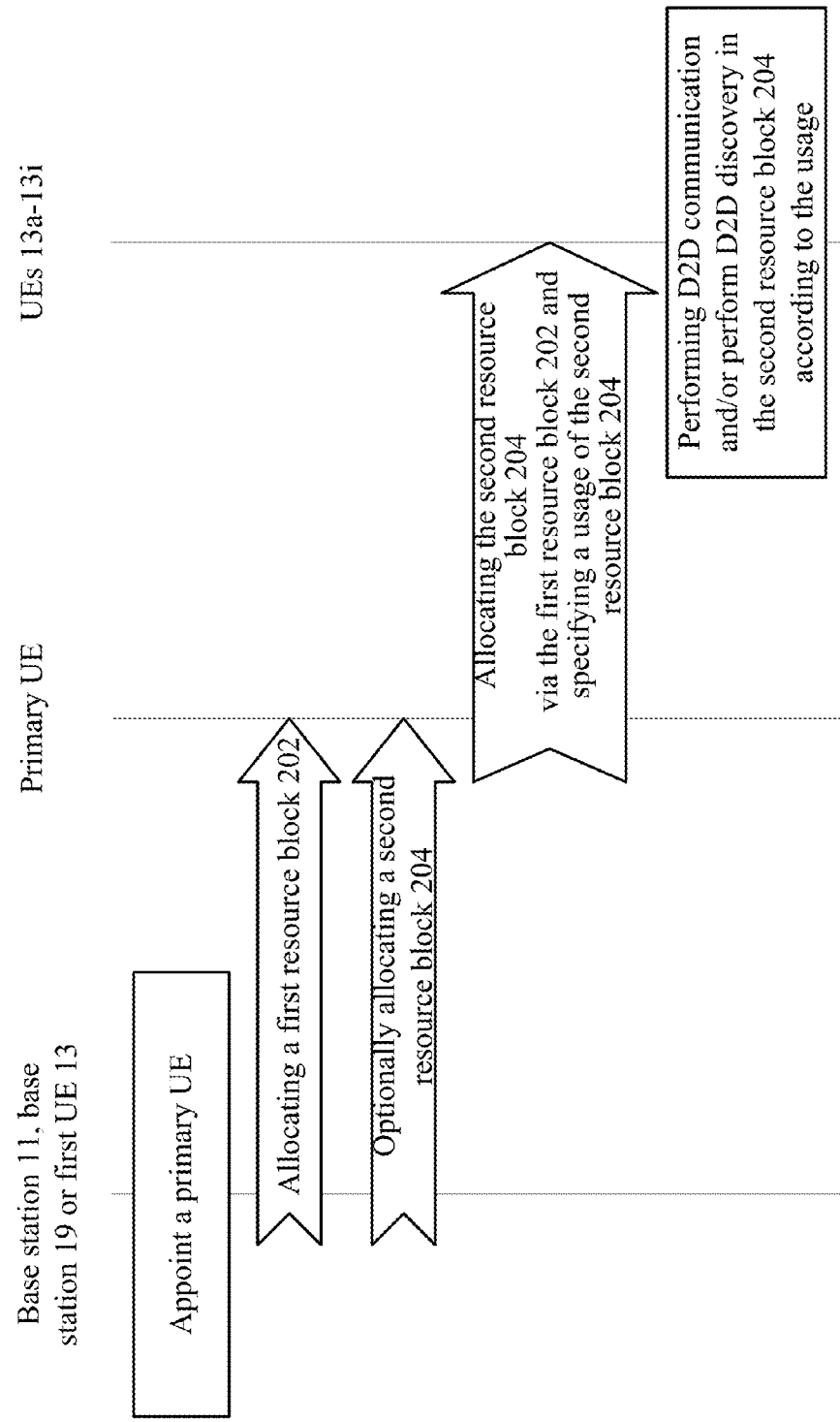
FIG. 3B is a schematic view illustrating specific operations of the wireless communication system shown in FIG. 1 when performing D2D communication in another communication mode.

FIG. 3B is a schematic view illustrating specific operations of the wireless communication system 1 when performing D2D communication in another communication mode. As shown in FIG. 3B, the base station 11, the base station 19 or the first UE 13 may specify a communication mode in which all or a part of the UEs 13a-13i perform the D2D communication to be an autonomous mode by use of the resource allocation information 20 or the adjusted resource allocation information 24. In the autonomous mode, the base station 11, the base station 19 or the first UE 13 firstly appoints a primary UE from the UEs 13a-13i, and allocates at least one first resource block 202 to the primary UE. Then, the primary UE may allocate at least a second resource block 204 to all or a part of the UEs 13a-13i via the first resource block 202 and specifies a usage of the second resource block 204. Then, the UEs 13a-13i perform corresponding D2D communication in the second resource block 204 according to the usage of the second resource block 204. In the autonomous mode, the second resource block 204 can be allocated by the base station 11, the base station 19 or the first UE 13 to the primary UE, and then allocated by the primary UE to all or a part of the UEs 13a-13i; or the second resource block 204 may also be allocated to all or a part of the UEs 13a-13i by the primary UE on its own.

As an example, when the UE 13a is to perform one-to-one D2D communication with the UE 13c, the base station 11, the base station 19 or the first UE 13 may appoint a primary UE (e.g., the UE 13b) from the UEs 13a-13i and allocates at least one first resource block 202 to the UE 13b. Then, the UE 13b may allocate at least one second resource block 204 to the UE 13a and the UE 13c via the resources in the first resource block 202, and specify how uplink transmission be performed by the UE 13a (or the UE 13c) via the resources in the second resource block 204 and how reception be performed by the UE 13c (or the UE 13a) via the resources in the second resource block 204.

As another example, when the UE 13a is to perform one-to-multiple D2D communication or multiple-to-one D2D communication with the UEs 13b-13d, the base station 11, the base station 19 or the first UE 13 may appoint a primary UE (e.g., the UE 13b) from the UEs 13a-13i and allocates at least one first resource block 202 to the UE 13b. Then, the UE 13b may allocate at least one second resource block 204 to the UEs 13a-13d via the resources in the first resource block 202, and specify how uplink transmission be performed by the UE 13a (or the UEs 13b-13d) via the resources in the second resource block 204 and how reception be performed by the UEs 13b-13d (or the UE 13a) via the resources in the second resource block 204.

As a further example, when the UEs 13a-13d are to perform multiple-to-multiple D2D communication with the UEs 13e-13g, the base station 11, the base station 19 or the first UE 13 may appoint a primary UE (e.g., the UE 13b) from the UEs 13a-13i and allocates at least one first resource block 202. Then, the UE 13b may allocate at least one second resource block 204 to the UEs 13a-13g via the resources in the first resource block 202, and specify how uplink transmission be performed by the UEs 13a-13d (or the UEs 13e-13g) via the resources in the second resource block 204 and how reception be performed by the UEs 13e-13g (or the UE 13a) via the second resource block 204.

As yet another example, when the UE 13a is to perform D2D communication with the UE 13c via the UE 13b, the base station 11, the base station 19 or the first UE 13 may appoint a primary UE (e.g., the UE 13b) from the UEs 13a-13i and allocates at least one first resource block 202. Then, the UE 13b may allocate at least one second resource block 204 to the UEs 13a-13c via the resources in the first resource block 202, and specify how uplink transmission be performed by the UE 13a (or the UE 13c) via the resources in the second resource block 204, relaying be performed by the UE 13b via the resources in the second resource block 204 and how reception be performed by the UE 13c (or the UE 13a) via the resources in the second resource block 204.

Figure 3C:
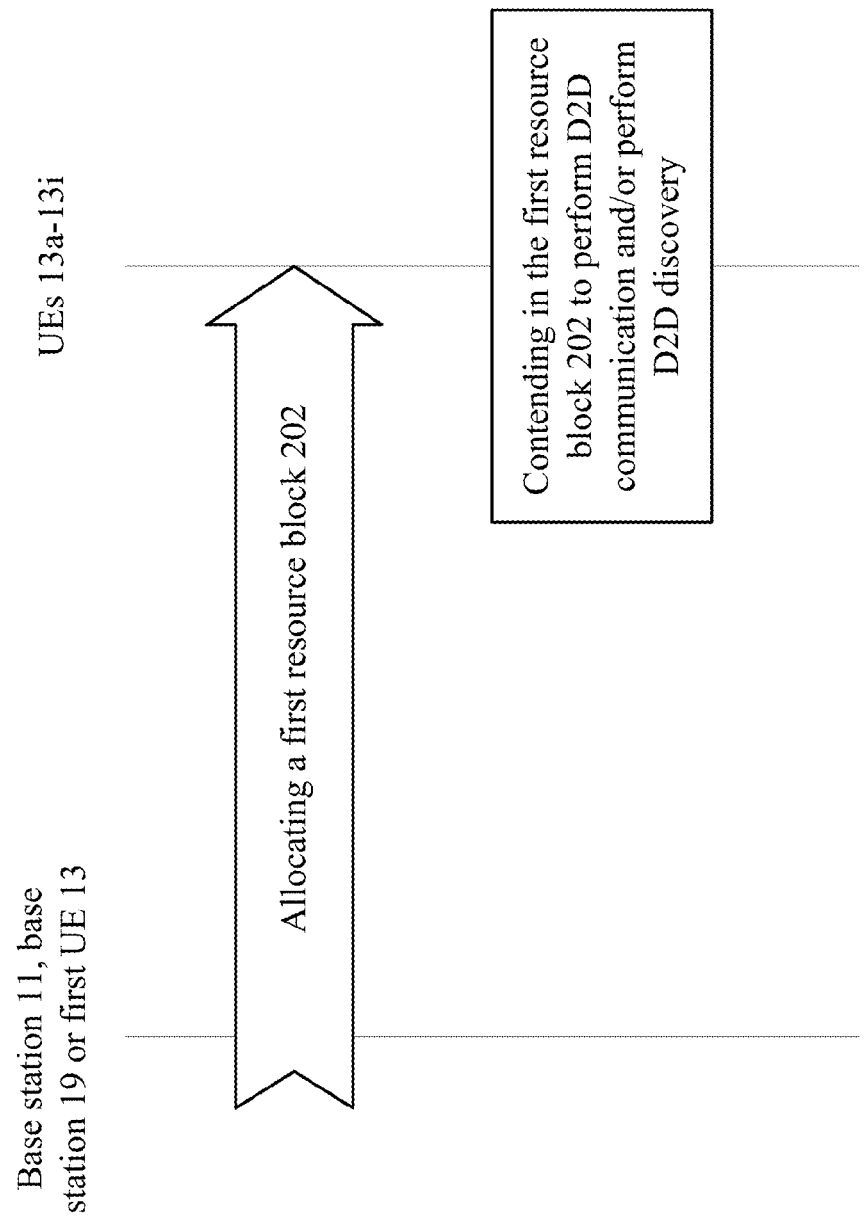
FIG. 3C is a schematic view illustrating specific operations of the wireless communication system shown in FIG. 1 when performing D2D communication in a further communication mode.

FIG. 3C is a schematic view illustrating specific operations of the wireless communication system 1 when performing D2D communication in a further communication mode. As shown in FIG. 3C, the base station 11, the base station 19 or the first UE 13 may specify a communication mode in which all or a part of the UEs 13a-13i perform the D2D communication to be a contention mode by use of the resource allocation information 20 or the adjusted resource allocation information 24. In the contention mode, the base station 11, the base station 19 or the first UE 13 can allocate at least one first resource block 202 to all or a part of the UEs 13a-13i. Then, all or a part of the UEs 13a-13i contend in the first resource block 202 to perform corresponding D2D communication.

As an example, when the UE 13a is to perform one-to-one D2D communication with the UE 13c, the base station 11, the base station 19 or the first UE 13 can allocate at least one first resource block 202 to the UE 13a and the UE 13c. Then, the UE 13a and the UE 13c can contend in the first resource block 202, and the one which wins the contention will be able to perform uplink transmission or reception in the first resource block 202.

As another example, when the UE 13a is to perform one-to-multiple D2D communication or multiple-to-one D2D communication with the UEs 13b-13d, the base station 11, the base station 19 or the first UE 13 can allocate at least one first resource block 202 to the UEs 13a-13d. Then, the UEs 13a-13d can contend in the first resource block 202, and the one which wins the contention will be able to perform uplink transmission or reception in the first resource block 202.

As a further example, when the UEs 13a-13d are to perform multiple-to-multiple D2D communication with the UEs 13e-13g, the base station 11, the base station 19 or the first UE 13 can allocate at least one first resource block 202 to the UEs 13a-13g. Then, the UEs 13a-13g can contend in the first resource block 202, and the one which wins the contention will be able to perform uplink transmission or reception in the first resource block 202.

As yet another example, when the UE 13a is to perform D2D communication with the UE 13c via the UE 13b, the base station 11, the base station 19 or the first UE 13 can allocate at least one first resource block 202 to the UEs 13a-13c. Then, the UEs 13a-13c can contend in the first resource block 202. If the UE 13a or the UE 13c wins the contention, it can perform uplink transmission or reception in the first resource block 202; and if the UE 13e wins the contention, the UE 13b can perform relaying in the first resource block 202.

In the contention mode, if a UE that is to perform D2D communication fails in the contention, it can choose another UE as a relay to perform the D2D communication via the relay. For example, assume that the UE 13a is to perform D2D communication with the UE 13c, and the base station 11, the base station 19 or the first UE 13 has allocated at least one first resource block 202 to the UE 13a and the UE 13c. Then if the UE 13a or the UE 13c fails in the contention for the first resource block 202, the UE 13a or the UE 13c can choose another UE (e.g., the UE 13b) as a relay to perform the D2D communication via the relay.

If data needs to be relayed from the UE 13a to other UEs (e.g., the UEs 13c-13e) via the UE 13b, the UE 13b can acquire additional information to indicate relay information necessary for the UE 13a. This information helps the UE 13b to know equipments (e.g., all equipments other than the UEs 13a and 13b) that would be involved in the relaying process. These equipments may be UEs, equipments with similar base station functions, or UEs from a UE group that are related to the D2D communication target. The related information may comprise information which help the UE 13b to know getting the information necessary for contention or for scheduling, and various data from the UE 13a. Such information can be further transmitted to a higher layer to decide how to manage the transmission (e.g., the transmission time sequence, the transmission priority order, the sub-group resource allocation and etc).

In case there is a need to divide devices into sub-groups, the UE that acts as a relay might be able to handle the hierarchical mode resource allocation, and if necessary, the original resource can be divided for use in communication between devices of sub-groups. A UE or the UE that acts as a relay may also allow a scheduling and/or contention mechanism to be established for these resources. For example, some resources are used for scheduling, and some resources are used for contention. The UE or the UE that acts as a relay may detect and use some remaining resource blocks for contention without the need of additional resource allocation.

A UE may be chosen as a relay in the group thereof, or may be chosen as a relay when cooperating with a different group (e.g., a UE that may be used as a relay can be discovered through a contention mechanism). For example, if the UE 13a is only able to communicate with the UE 13b, then the UE 13b will be used as a relay to relay D2D data to other UEs (e.g., to the UE 13c and/or the UE 13d).

A UE can broadcast or relay its capability to other UEs. For example, in case of no contention, a message may be replied when a permit to relaying is obtained in order to relay effective resources to all or a specific part of UEs. Collecting related resources may be performed according to a decision of an upper layer or performed via sequential forwarding. If it is necessary for other UEs to relay or broadcast their own information with a higher priority level, a higher priority order may also be obtained according to the power level. The UE may also broadcast some system information or emergency events. The UE may stop relaying repeated messages by evaluating the number of denial transmissions via an upper-layer counter. The UE may also transmit a specific sequence to stop transmitting or to resist a contention sequence and UE relay capacity.

Figure 4:
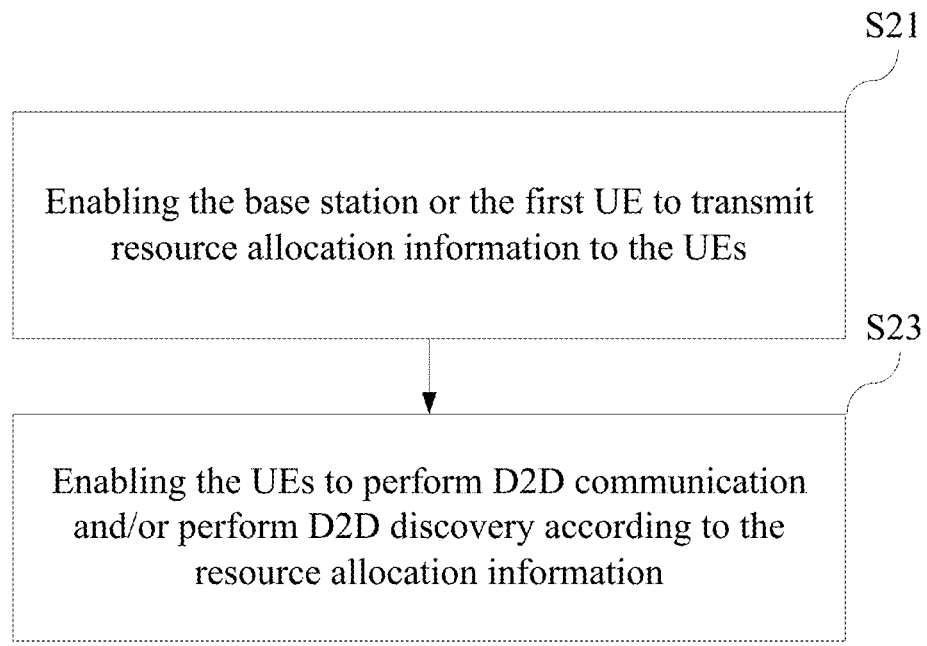
FIG. 4 is a flowchart diagram of a resource allocation method for use in a wireless communication system according to an embodiment of the present invention.

Another embodiment of the present invention (briefly called as "the second embodiment" hereinbelow) is a resource allocation method for use in a wireless communication system. The wireless communication system may comprise a base station and a plurality of UEs. The UEs may include a first UE. For example, the second embodiment may be a resource allocation method for use in the wireless communication system 1 of the first embodiment. FIG. 4 is a flowchart diagram of the resource allocation method. As shown in FIG. 4, the resource allocation method comprises the following steps of: step S21, enabling the base station or the first UE to transmit resource allocation information to the UEs; and step S23, enabling the UEs to perform device-to-device communication and/or perform device-to-device discovery according to the resource allocation information.

In other embodiments of the present invention, the resource allocation information may comprise a communication mode of the device-to-device communication.

In other embodiments of the present invention, the communication mode may be a central control mode. In the central control mode, the step S21 may comprise: enabling the base station or the first UE to allocate a first resource block to the UEs and specify a usage of the first resource block. Additionally, the step S23 may comprise: enabling the UEs to perform the device-to-device communication in the first resource block according to the usage of the first resource block.

In other embodiments of the present invention, the communication mode may be an autonomous mode. In the autonomous mode, the step S21 may comprise: enabling the base station or the first UE to appoint a primary UE from the UEs and allocate a first resource block and a second resource block to the primary UE; and enabling the primary UE to allocate the second resource block to the UEs via the first resource block and specify a usage of the second resource block. Additionally, the step S23 may comprise: enabling the UEs to perform the device-to-device communication in the second resource block according to the usage of the second resource block.

In other embodiments of the present invention, the communication mode is a contention mode. In the contention mode, the step S21 may comprise: enabling the base station or the first UE to allocate a first resource block to the UEs. Additionally, the step S23 may comprise: enabling the UEs to contend in the first resource block to perform the device-to-device communication.

In other embodiments of the present invention, the base station or the first UE may transmit the resource allocation information to the UEs via a wireless resource control interface or a device-to-device interface.

In other embodiments of the present invention, the UEs may be in an idle mode or a connected mode.

In other embodiments of the present invention, the resource allocation method of the second embodiment may further comprise the following step of: enabling the base station or the first UE to transmit adjusted resource allocation information to the UEs according to a resource allocation adjustment request.

In other embodiments of the present invention, the resource allocation method of the second embodiment may further comprise the following step of: enabling ones of the UEs that have received the resource allocation information to relay a part or all of the resource allocation information to ones of the UEs that have not received the resource allocation information.

In addition to the aforesaid steps, the resource allocation method of the second embodiment can also execute all steps corresponding to operations of the wireless communication system 1 of the first embodiment. The method in which the second embodiment executes the corresponding steps will be readily appreciated by those of ordinary skill in the art based on the explanation of the first embodiment, and thus will not be further described herein.

According to the above descriptions, a wireless communication system and a resource allocation method thereof are provided in the present invention. More particularly, when a plurality of UEs need to perform D2D communication (including one-to-one D2D communications, one-to-multiple D2D communications, multiple-to-one D2D communications, multiple-to-multiple D2D communications, and D2D communications performed through relaying) and/or perform device-to-device discovery therebetween, the present invention can evaluate various resources necessary for the D2D communication and/or device-to-device discovery by means of a base station or one of the UEs according to the pre-existing resource conditions and different needs, and transmit a corresponding piece of resource allocation information to the UEs. Then, the UEs can perform the D2D communication and/or device-to-device discovery according to the resource allocation information received. Because the resources necessary for the D2D communication and/or device-to-device discovery between the UEs are pre-evaluated by the base station or one of the UEs before being allocated, the problem of resource contention is avoided in the present invention. Furthermore, interferences of the D2D communication and/or device-to-device discovery of the UEs and the pre-existing communication between the UEs and the base station with each other can also be effectively avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication system, comprising:
   a base station; and
   a plurality of user equipments (UEs), including a first UE;
   wherein the first UE is configured to evaluate resources necessary for the UEs to perform device-to-device communication or device-to-device discovery and configured to transmit resource allocation information to the other UEs according to the evaluated resources, and the UEs are configured to perform the device-to-device communication or perform the device-to-device discovery according to the resource allocation information;
   wherein the resource allocation information comprises a communication mode of the device-to-device communication; and
   wherein the communication mode is a central control mode, the first UE allocates a first resource block to the UEs and specifies a usage of the first resource block, and the UEs perform the device-to-device communication in the first resource block according to the usage of the first resource block.

2. The wireless communication system as claimed in claim 1, wherein the first UE transmits the resource allocation information to the UEs via a wireless resource control interface or a device-to-device interface.

3. The wireless communication system as claimed in claim 1, wherein the UEs are in an idle mode or a connected mode.

4. The wireless communication system as claimed in claim 1, wherein the first UE is further configured to transmit adjusted resource allocation information to the UEs according to a resource allocation adjustment request.

5. The wireless communication system as claimed in claim 1, wherein ones of the UEs that have received the resource allocation information are further configured to relay a part or all of the resource allocation information to ones of the UEs that have not received the resource allocation information.

6. A wireless communication system, comprising:
a base station; and
a plurality of user equipments (UEs), including a first UE;
wherein the first UE is configured to evaluate resources necessary for the UEs to perform device-to-device communication or device-to-device discovery and configured to transmit resource allocation information to the other UEs according to the evaluated resources, and the UEs are configured to perform the device-to-device communication or perform the device-to-device discovery according to the resource allocation information;
wherein the resource allocation information comprises a communication mode of the device-to-device communication; and
wherein the communication mode is an autonomous mode, the first UE appoints a primary UE from the UEs and allocates a first resource block to the primary UE, and the primary UE is configured to allocate a second resource block to the UEs via the first resource block and specify a usage of the second resource block, and the UEs perform the device-to-device communication in the second resource block according to the usage of the second resource block.

7. The wireless communication system as claimed in claim 6, wherein the first UE transmits the resource allocation information to the UEs via a wireless resource control interface or a device-to-device interface.

8. The wireless communication system as claimed in claim 6, wherein the UEs are in an idle mode or a connected mode.

9. The wireless communication system as claimed in claim 6, wherein the first UE is further configured to transmit adjusted resource allocation information to the UEs according to a resource allocation adjustment request.

10. The wireless communication system as claimed in claim 6, wherein ones of the UEs that have received the resource allocation information are further configured to relay a part or all of the resource allocation information to ones of the UEs that have not received the resource allocation information.

11. A wireless communication system, comprising:
a base station; and
a plurality of user equipments (UEs), including a first UE;
wherein the first UE is configured to evaluate resources necessary for the UEs to perform device-to-device communication or device-to-device discovery and configured to transmit resource allocation information to the other UEs according to the evaluated resources, and the UEs are configured to perform the device-to-device communication or perform the device-to-device discovery according to the resource allocation information;
wherein the resource allocation information comprises a communication mode of the device-to-device communication; and
wherein the communication mode is a contention mode, the first UE allocates a first resource block to the UEs, and the UEs contend in the first resource block to perform the device-to-device communication.

12. The wireless communication system as claimed in claim 11, wherein the first UE transmits the resource allocation information to the UEs via a wireless resource control interface or a device-to-device interface.

13. The wireless communication system as claimed in claim 11, wherein the UEs are in an idle mode or a connected mode.

14. The wireless communication system as claimed in claim 11, wherein the first UE is further configured to transmit adjusted resource allocation information to the UEs according to a resource allocation adjustment request.

15. The wireless communication system as claimed in claim 11, wherein ones of the UEs that have received the resource allocation information are further configured to relay a part or all of the resource allocation information to ones of the UEs that have not received the resource allocation information.

16. A resource allocation method for use in a wireless communication system, the wireless communication system comprising a base station and a plurality of UEs, and the UEs including a first UE, the resource allocation method comprising the following steps of:
(a) the first UE evaluating resources necessary for the UEs to perform a device-to-device communication or a device-to-device discovery and transmitting resource allocation information to the other UEs according to the evaluated resources; and
(b) performing by the UEs at least one of the device-to-device communication or performing the device-to-device discovery according to the resource allocation information;
wherein the resource allocation information comprises a communication mode of the device-to-device communication; and
wherein:
the communication mode is a central control mode;
the step (a) includes allocating a first resource block to the UEs and specifying a usage of the first resource block by the first UE; and
the step (b) includes performing by the UEs the device-to-device communication in the first resource block according to the usage of the first resource block.

17. The resource allocation method as claimed in claim 16, wherein the first UE transmits the resource allocation information to the UEs via a wireless resource control interface or a device-to-device interface.

18. The resource allocation method as claimed in claim 16, wherein the UEs are in an idle mode or a connected mode.

19. The resource allocation method as claimed in claim 16, further comprising the following step of:
(c) transmitting by the first UE adjusted resource allocation information to the UEs according to a resource allocation adjustment request.

20. The resource allocation method as claimed in claim 16, further comprising the following step of:
(d) relaying by one of the UEs that have received the resource allocation information at least a part of the resource allocation information to at least one of the UEs that have not received the resource allocation information.

21. A resource allocation method for use in a wireless communication system, the wireless communication system comprising a base station and a plurality of UEs, and the UEs including a first UE, the resource allocation method comprising the following steps of:
(a) the first UE evaluating resources necessary for the UEs to perform a device-to-device communication or a device-to-device discovery and transmitting resource allocation information to the other UEs according to the evaluated resources; and (b) performing by the UEs at least one of the device-to-device communication or performing the device-to-device discovery according to the resource allocation information;

wherein the resource allocation information comprises a communication mode of the device-to-device communication; and wherein:

the communication mode is an autonomous mode;

the step (a) comprises the following steps of:
appointing by the first UE a primary UE from the UEs and allocate a first resource block to the primary UE; and
allocating by the primary UE a second resource block to the UEs via the first resource block and specifying a usage of the second resource block; and the step (b) comprises: performing by the UEs the device-to-device communication in the second resource block according to the usage of the second resource block.

22. The resource allocation method as claimed in claim 21, wherein the first UE transmits the resource allocation information to the UEs via a wireless resource control interface or a device-to-device interface.

23. The resource allocation method as claimed in claim 21, wherein the UEs are in an idle mode or a connected mode.

24. The resource allocation method as claimed in claim 21, further comprising the following step of:
(c) transmitting by the first UE adjusted resource allocation information to the UEs according to a resource allocation adjustment request.

25. The resource allocation method as claimed in claim 21, further comprising the following step of:
(d) relaying by one of the UEs that have received the resource allocation information at least a part of the resource allocation information to at least one of the UEs that have not received the resource allocation information.

26. A resource allocation method for use in a wireless communication system, the wireless communication system comprising a base station and a plurality of UEs, and the UEs including a first UE, the resource allocation method comprising the following steps of:
(a) the first UE evaluating resources necessary for the UEs to perform a device-to-device communication or a device-to-device discovery and transmitting resource allocation information to the other UEs according to the evaluated resources; and
(b) performing by the UEs at least one of the device-to-device communication or performing the device-to-device discovery according to the resource allocation information;

wherein the resource allocation information comprises a communication mode of the device-to-device communication; and wherein:

the communication mode is a contention mode;

the step (a) comprises: allocating by the first UE a first resource block to the UEs; and the step (b) comprises: contending by the UEs in the first resource block to perform the device-to-device communication.

27. The resource allocation method as claimed in claim 26, wherein the first UE transmits the resource allocation information to the UEs via a wireless resource control interface or a device-to-device interface.

28. The resource allocation method as claimed in claim 26, wherein the UEs are in an idle mode or a connected mode.

29. The resource allocation method as claimed in claim 26, further comprising the following step of:
(c) transmitting by the first UE adjusted resource allocation information to the UEs according to a resource allocation adjustment request.

30. The resource allocation method as claimed in claim 26, further comprising the following step of:
(d) relaying by one of the UEs that have received the resource allocation information at least a part of the resource allocation information to at least one of the UEs that have not received the resource allocation information.

* * * * *